March 19, 1957     A. P. PAGÈS     2,786,146
DEVICE FOR MEASURING DISPLACEMENT OF CONDUCTORS
INSIDE ELECTRIC CABLE SHEATH
Filed April 28, 1954

United States Patent Office 2,786,146
Patented Mar. 19, 1957

2,786,146

DEVICE FOR MEASURING DISPLACEMENT OF CONDUCTORS INSIDE ELECTRIC CABLE SHEATH

André Paul Pagès, Paris, France, assignor to Societe Aisacienne de Constructions Mecaniques, Paris, France Application April 28, 1954, Serial No. 426,243

Claims priority, application France May 22, 1953

2 Claims. (Cl. 250—106)

The present invention relates to a device for measuring the systematic or accidental displacements of the internal elements of an electric cable provided with a lead sheath and eventually with a protecting sheath of steel tape or wire, laid outside the lead sheath. It is known that in modern telephone cables which transmit a very large number of simultaneous messages in cable elements of various constitutions, balanced or coaxial, a very high standard of uniformity is indispensable in the cabling of the elements, and it should be possible to check these elements, even after the last manufacturing operations undergone by the cable or even after it has been laid. It also happens that the laying of some cables is effected under difficult material conditions, due to the nature of the ground or of the conduits wherein the cable is laid. Thus it may happen that the inner cable elements have suffered damages which are shown by changes in the relative positions of said elements. It is obvious that such modifications in the relative positions cannot be detected by direct inspection without opening the cable itself.

The device of the invention makes it possible to check accurately the cable for any alteration of the relative positions of its inside elements and facilitates eventual repair by precise location of faults. According to the present invention, there is provided a device for measuring displacement of conductors inside the sheath of an electric cable, comprising at least one radioactive marker in the form of a piece of wire secured to each conductor the displacement of which is to be measured, said piece of wire being made of a material the composition of which includes at least one component capable of partial transmutation into a radioactive isotope by activation in the neutron flux of a nuclear reactor, said piece of wire being secured to said each conductor with its larger dimension substantially perpendicular to the direction of its anticipated displacement and having been activated previous to its securing to said conductor, whereby said displacement may be measured with the help of a Geiger counter sensitive to radiation emitted by said activated material by moving said counter along said cable sheath and locating points of maximum radiation intensity.

The radioactive marker may be provided in the form of a piece of wire made of a metal or metal alloy at least one of the constituents of which is a chemical element capable of partial transmutation, by activation in the neutron flux of a nuclear reactor, into a radioactive isotope emitting in particular a gamma radiation sufficiently penetrating for a substantial fraction thereof to be detectable outside the enclosure containing the object bearing the marker, said piece being activated according to this method before being attached by any known means, by gluing for instance, on the element the displacement of which is to be measured. Amongst the activatable chemical elements which can be used for carrying out the invention, gold may be mentioned, as it can easily be drawn into fine wires which, after activation in a nuclear reactor, emits a radiation which, without requiring special precautions in handling, is sufficiently intense to be detected by means of a counter of usual design even after passing through a few centimeters of lead.

When use is made of a radioactive marker comprising a gold wire transmuted as stated above, since the activity of that substance decreases by one half within about three days, the displacement of an element can still be measured, with a sufficiently large initial activity of the marker or markers placed on the cable, after one week or more if necessary. There may be placed on one of the cable elements contained in the cable, transversal markers for observing the component of the longitudinal displacement with respect to the axis of the cable, and longitudinal markers for observing the corresponding angular component.

The operation of the device according to the invention will be explained with more detail hereinafter, with reference to the appended drawings, illustrating an embodiment of a device for applying this method, by way of example, to the measurement of the elongations undergone by the core of a telecommunication cable subjected to a heavy traction. In these drawings.

Figure 1:
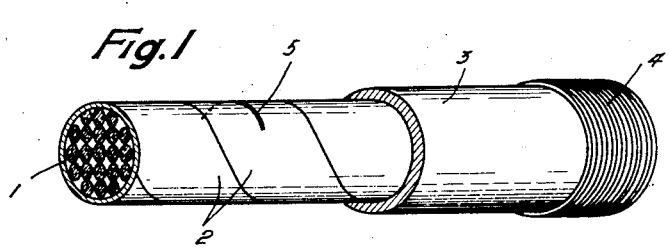
Figure 1 is a perspective view of a cable section, partly opened to show the arrangement of the radioactive markers.

In the example shown, the cable subjected to the traction comprises, as shown in Figure 1, a core consisting of a number of cable elements 1 assembled so as to form a cylindrical core covered with paper tapes 2; the core is covered with a continuous lead sheath 3 and on said sheath a protective armour is arranged, consisting of steel wires 4 arranged along a helix, with interposed jute layers impregnated with a suitable fluid material.

In accordance with the method of the invention, markers are fixed on the core, along circular arcs normal to the axis parallel to each other and at distances of say 3 meters from one another. These markers comprise, for example, pieces of gold wire 5, 0.25 mm. in diameter, and 5 cm. long. These wires are placed, previously, for a few days, in the neutron flux of a nuclear reactor, under the action of which atoms of stable natural gold are transmitted into unstable isotope atoms emitting a gamma radiation, with a half life of about three days. The activity of each marker, at the time of laying, may be of the order of 1 millicurie.

After the cable has been assembled, sheathed with lead and armoured, it is unwound in order to measure, according to the method of the invention, the relative elongation undergone by the core under the action of a longitudinal traction.

Figure 2:
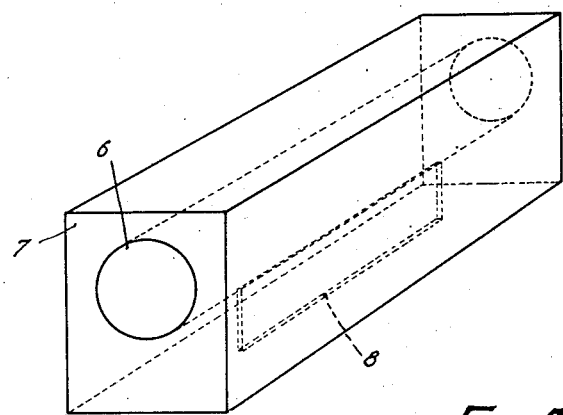
Figure 2 represents a block of material only slightly pervious to the radiations, of lead for instance, provided with a slot and in which a Geiger counter is introduced.
Figure 3:
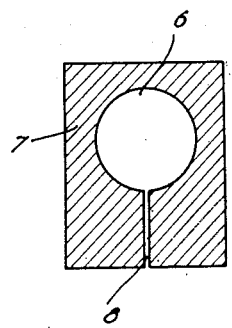
Figure 3 is a transverse section of this block.

A Geiger counter 6, of a cylindrical shape is introduced in a recess having practically the same shape, in a parallelepipedic block 7 (Figures 2 and 3). This block comprises walls 20 mm. thick, one of which is provided with a long and narrow slot 8, 1 mm. wide.

The Geiger counter is connected by a flexible cord with a box containing, according to usual practice, a power supply battery and a pulse counting electronic device including a galvanometer for measuring a current proportional to the number (average) of pulses caused, per unit time, by the gamma rays emitted by the gold markers and operating the Geiger counter. The intensity of the radiation picked up through the slot, when the plane of said slot contains a marker, is large enough to render negligible the current fluctuations due to the irregularity of the discharges and to residual radiation, so that said fluctuations do not limit the accuracy of the localizations.

When the cable is unwound, without any traction being exerted thereon, the distance between the markers is measured by displacing the counter placed in the lead block 7, in the vicinity of the surface of the cable, the slot 8 being turned towards the cable and looking for the positions giving the maximum deviation observed on the galvanometer, each of these positions then being such that the middle plane of the slot 8 contains the middle plane of a gold marker 5.

Figure 4:
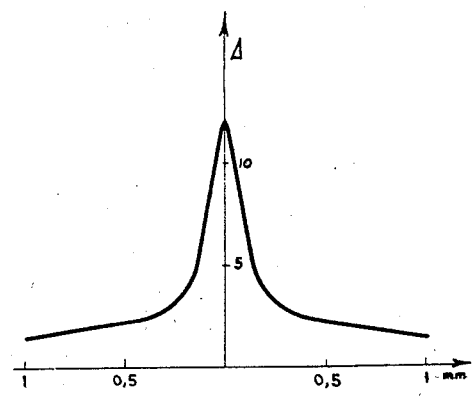
Figure 4 shows the deflections of the pointer of a galvanometer associated with a pulse integrator energized by a Geiger counter placed inside the above block, and displaced on either side of that position which allows the maximum radiation to pass through a narrow slot provided in said block.

Figure 4 shows the deflections Δ successively read on the galvanometer when the block is displaced on either side of the optimum position while maintaining the plane of the slot parallel with that of the markers, the deviations with respect to this optimum position being plotted as abscissae.

The same measurement is effected after applying to the cable a 500 kg. traction. It has been found that the average distance of two consecutive markers, which was 3002.0 mm. with no traction, increased to 3004.5 mm. during the application of the traction, corresponding therefore to an elongation of 1.6 mm. per ton.

What is claimed is:

1. A device for measuring displacement of conductors inside the sheath of an electric cable comprising at least one radioactive marker in the form of a piece of wire secured to each conductor the displacement of which is to be measured, said piece of wire being made of a material the composition of which includes at least one component capable of partial transmutation into a radioactive isotope by activation in the neutron flux of a nuclear reactor, said piece of wire being secured to said each conductor with its larger dimension substantially perpendicular to the direction of its anticipated displacement and being activated previously to its securing to said conductor, whereby displacement of the conductors may be measured with the help of a Geiger counter sensitive to radiation emitted by said activated material when the Geiger counter is moved along said cable sheath, the Geiger counter locating points of maximum radiation intensity.

2. A device as claimed in claim 1, wherein said piece of wire is a piece of gold wire.

References Cited in the file of this patent

UNITED STATES PATENTS

| | | |
|---|---|---|
| 2,206,634 | Fermi et al. | July 2, 1940 |
| 2,315,845 | Ferris | Apr. 6, 1943 |
| 2,378,328 | Robinson | June 12, 1945 |
| 2,399,061 | Josenblum | Apr. 23, 1946 |
| 2,518,327 | Jahn | Aug. 8, 1950 |
| 2,640,936 | Pajes | June 2, 1953 |